United States Patent [19]

Shepard, Jr.

[11] 3,810,167

[45] May 7, 1974

[54] MAGNETIC KEYBOARD ENCODING DEVICE

[75] Inventor: Francis H. Shepard, Jr., Summit, N.J.

[73] Assignee: Vogue Instrument Corporation, Plainview, N.Y.

[22] Filed: Sept. 1, 1971

[21] Appl. No.: 176,928

Related U.S. Application Data

[63] Continuation-in-part of Ser. No. 724,767, April 29, 1968, Pat. No. 3,683,110.

[52] U.S. Cl. .................. 340/365, 197/98, 178/17 C, 235/145 R

[51] Int. Cl. .......................................... H04l 15/06

[58] Field of Search ......... 340/365; 178/17 R, 17 C; 235/145 R, 145 A; 197/98

[56] References Cited

UNITED STATES PATENTS

| | | | |
|---|---|---|---|
| 3,585,297 | 6/1971 | Scuitto | 340/365 L |
| 3,363,737 | 1/1968 | Wada et al. | 340/365 L |
| 3,430,226 | 2/1969 | Chow et al. | 340/365 L |
| 3,439,117 | 4/1969 | Mathamel et al. | 340/365 L |
| 3,160,875 | 12/1964 | Bernard | 340/365 L |
| 3,588,875 | 6/1971 | Gabor | 340/365 R |

FOREIGN PATENTS OR APPLICATIONS

| | | | |
|---|---|---|---|
| 2,016,104 | 12/1970 | Germany | 197/98 |

*Primary Examiner*—Thomas A. Robinson
*Attorney, Agent, or Firm*—Curtis, Morris & Safford

[57] ABSTRACT

Each key in the encoding keyboard has a key module which, when assembled into the keyboard, forms a magnetic flux path around one or more conductors. A small permanent magnet is in the magnetic flux path. When the key lever is depressed, an air gap is formed in the flux path by movement of an armature. Then, the armature is snapped rapidly back into place so as to quickly close the air gap and, thereby, rapidly decrease the reluctance of the magnetic path and increase the flux flowing in the path. The flux suddenly stops changing abruptly when the armature suddenly stops as it returns to its rest position. That flux change induces voltage pulses in the conductors encircled by the flux path. The number of conductors passing through each flux path varies in accordance with a code. Means are provided for detecting the voltage pulses developed in the conductors to thereby digitally encode the character represented by the key. The conductors preferably are on a printed circuit board which includes one or more magnetic members which are used, when assembled with the key modules, to complete the magnetic paths for the keys.

20 Claims, 10 Drawing Figures

INVENTOR.
FRANCIS H. SHEPARD, JR.
BY
Curtis, Morris & Safford
ATTORNEYS

INVENTOR.
FRANCIS H. SHEPARD, JR.
BY
Curtis, Morris & Safford
ATTORNEYS

INVENTOR.
FRANCIS H. SHEPARD, JR.
BY
Curtis, Morris & Safford
ATTORNEYS

MAGNETIC KEYBOARD ENCODING DEVICE

This patent application is a continuation-in-part of my co-pending U.S. Pat. application, Ser. No. 724,767, filed Apr. 29, 1968, now U.S. Pat. No. 3,683,110. The disclosure of that co-pending patent application hereby is incorporated herein by reference.

This invention relates to encoding devices, and particularly to keyboards for character encoding. More particularly, the invention relates to encoding devices utilizing magnetic flux changes for encoding purposes.

My above-identified co-pending patent application discloses an encoding keyboard in which the movement of each key lever is caused to change the flux in a magnetic core, and the flux changes induce voltages in conductors. Although the encoding device of my co-pending patent application is relatively simple and inexpensive to build and has other advantageous features, it is a major object of the present invention to provide an improvement of the encoding device.

More specifically, it is an object of the present invention to provide an encoding device which is more compact, less expensive to build, easier to maintain, and more reliable in operation than prior encoding devices.

In accordance with the present invention, the foregoing objects are met by the provision of an encoding device and method including a key member and a permanent magnet in a magnetic path, together with means for rapidly changing the reluctance of the magnetic path between a relatively low value and a relatively high value in response to actuation of the key member. Conductors arranged in a coded array pass through the magnetic path so as to receive induced voltage pulses when the conductors are intercepted by rapidly changing magnetic flux from the permanent magnet. Several such encoding devices are used in a keyboard. Each encoding device has its own permanent magnet and magnetic flux path so as to isolate the operation of one key from the next. Preferably, a spring is used to rapidly move a magnetic armature away from and towards the magnetic path to provide the reluctance change. The same spring is used to return the key to its uppermost position.

The foregoing and other objects and advantages of the invention will be described in or apparent from the following description and drawings.

THE KEYBOARD

Figure 1:
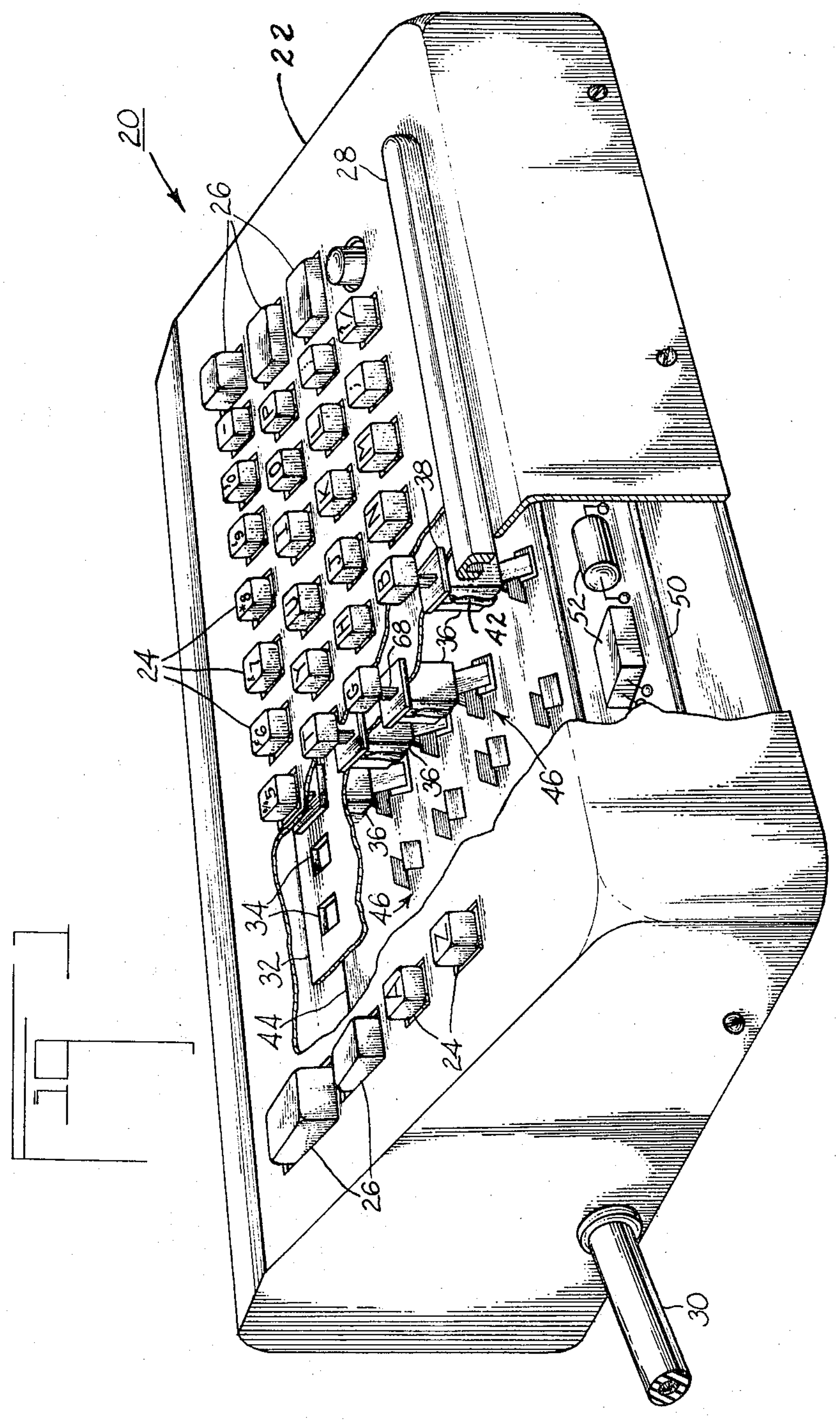
FIG. 1 is a perspective, partially broken away view of a keyboard constructed in accordance with the present invention.

FIG. 1 shows an encoding keyboard device 20 which includes a housing 22, character key tops 24, function key tops 26, and a space bar 28. An output cable 30 delivers digitally-coded electrical signals to a computer or other utilization device (not shown). The coded signals represent the characters or functions of the keys, or the space of the space bar 28.

Each key top 24 and 26 and the space bar 28 is connected to a separate key module 36 by means of a key lever or stem 68. Mounted in the housing 22 is a key module support plate 32 which is positioned just below the upper surface of the top of the keyboard unit 20. The plate has a plurality of rectangular holes 34 each of which is located immediately beneath one of the key tops 24. Each key module 36 fits down into one of the holes 34. Each module 36 has a rectangular body and an upper flange 38 extending beyond the outlines of the body, and fits into the hole 34 with the flange 38 resting against the upper surface of the plate 32. Each module has a spring clip 42 on its outside which tends to hold the key module in place. As it will be explained in greater detail below, the arms of the clip 42 can be depressed inwardly to allow the module 36 to be pulled upwardly out of the hole 34 so that each key module and key top can be replaced easily. This facilitates maintenance of the keyboard, and makes it relatively easy to change the characters appearing on the key tops of the keyboard.

Mounted in the housing 22 parallel to and below the plate 32 is a printed circuit code board 44 which bears a coded arrangement of conductors 46. An iron yoke 48 with a pair of upstanding arms is positioned on the board 44 immediately below each hole 34 in the support plate. Extending from the lower end of each key module 36 is a pair of iron tabs 40. When the tabs 40 are placed downwardly in contact with the upstanding arms of one of the yokes 48 a magnetically permeable path is formed internally within the key module 36 and around selected conductors on the code board 44. The path normally is closed so as to form a loop of magnetic material. A mechanism within each key module 36 rapidly opens and closes the magnetic path or loop when the key is depressed, thus inducing voltages in the wires 46 extending through the loop. These voltages are delivered through the output cable 30 to the utilization equipment.

Power supply components 52 and other electrical components of the device are mounted either on the board 44, or on a separate board 50 positioned below the code board 44.

As it will be explained in greater detail below, the code used in the keyboard can be changed rapidly and easily, simply by changing the code board. Thus, both the code and the keys or key modules can be changed rapidly and easily.

THE KEY MODULE

Figure 2:
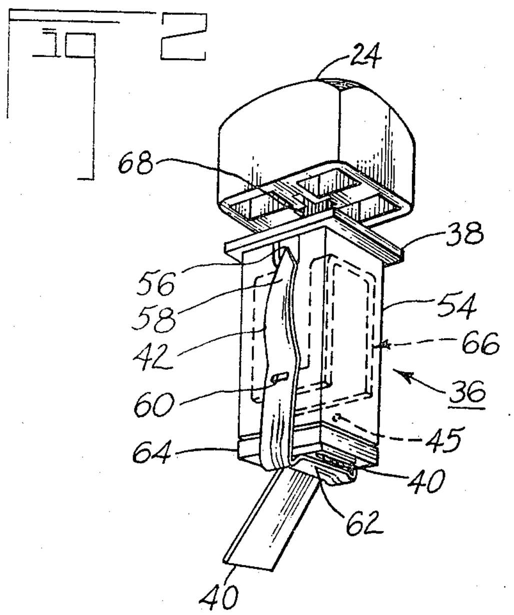
FIG. 2 is a perspective view of a key assembly used in the keyboard shown in FIG. 1.

FIG. 2 is a perspective view of one of the key modules 36, with its key top 24 and key stem 68 in place. One of the iron tabs 40 has been broken off in order to more clearly show the details of the spring clip 42. The key module includes a "non-magnetic," i.e., not magnetically permeable, rectangular metallic or molded plastic housing 54, an assembly 66 including a non-magnetic pusher device 70 (see FIG. 3), and a switching unit 80 (see FIG. 3). The switching unit 80 fits inside of the pusher 70, and, as is shown in FIG. 2, includes a molded plastic base 64 which holds the switching components together. The base 64 fits into the open bottom of the rectangular housing 54 and is held tightly in place by means of the clip 42.

The clip 42 is made of non-magnetic metal and has an indented bottom portion 62 which fits between the iron tabs 40. The clip 42 has a U-shape. Only one arm and the bottom of the U are shown in FIG. 2. The upper tip 58 of each arm of the U-shaped clip is pointed and is bent inwardly towards the housing 54. In the middle, each arm is bent outwardly, and then meets the outside of the case 54 at a point 60. There is a projection at each point 60 which fits into a hole 45 to hold the base 64 up against the bottom of the case 54 and fastens the clip to the housing 54. The pointed tip 58 of each arm extends near a hole 56 in the side of the case.

When the module 36 is being fitted into a hole 34 in the mounting plate 32, or when it is being removed from such a hole, the person performing the work depresses the arms of the clip 42 inwardly towards the housing 54, and the tips 58 of the arms extend into the holes 56 so as to move the clip out of the way. When the module 36 is in place in the hole 34, the tips 58 of the arms of the clip abut against the under-surface of the mounting plate 32 and hold each module securely in place.

Figure 3:
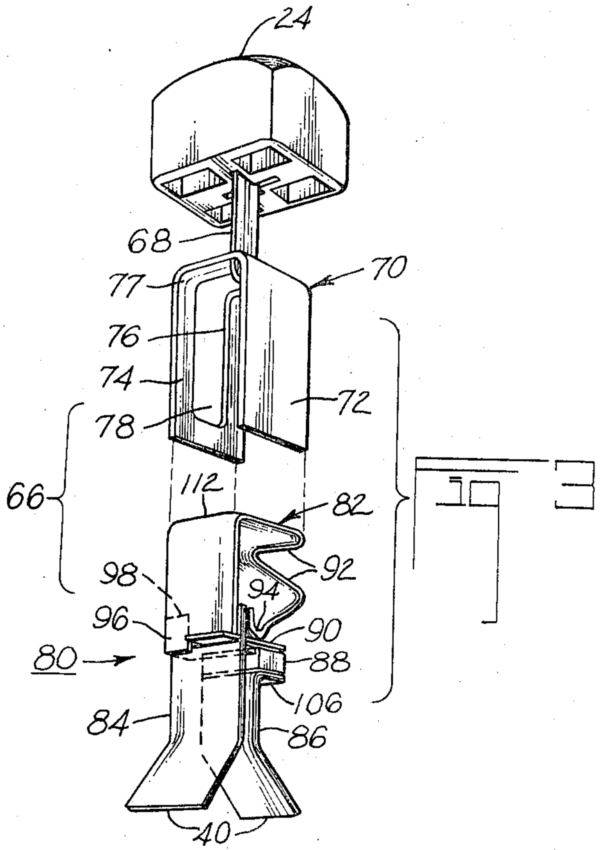
FIG. 3 is an exploded perspective view of several of the major components of the assembly shown in FIG. 2.

Referring now to FIGS. 3 through 6, the pusher 70 comprises a yoke formed from a single piece of non-magnetic metal. The stem 68 is formed by punching it out of the area indicated by the reference numeral 78. Then, the piece of metal is bent in two places as shown in FIG. 3.

The pusher unit 70 has a first side wall 72, an opposed side wall formed by legs 74 and 76, and an upper wall 77. The side walls fit downwardly over the switch assembly 80, in the manner indicated in FIG. 3, so that the upper wall 77 rests upon the upper surface 112 of a spring 82. The outer dimensions of the pusher unit 70 are made such that it fits snugly in the rectangular housing 54, but slides freely up and down in the housing, thus providing a smooth key stroke.

Figure 5:
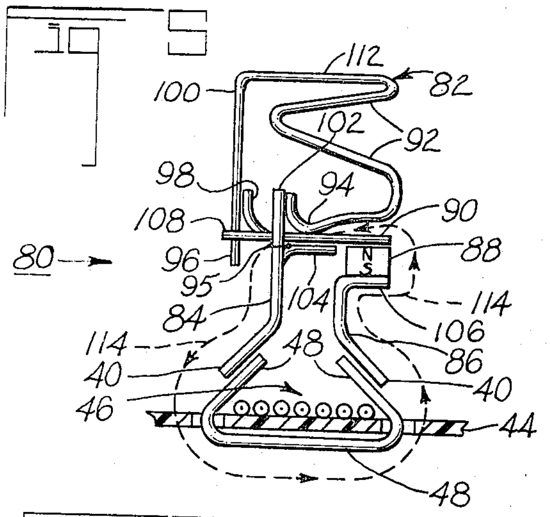
FIGS. 5 and 6 are elevation, partially schematic views illustrating the operation of the structures shown in FIGS. 1 through 4.
Figure 6:
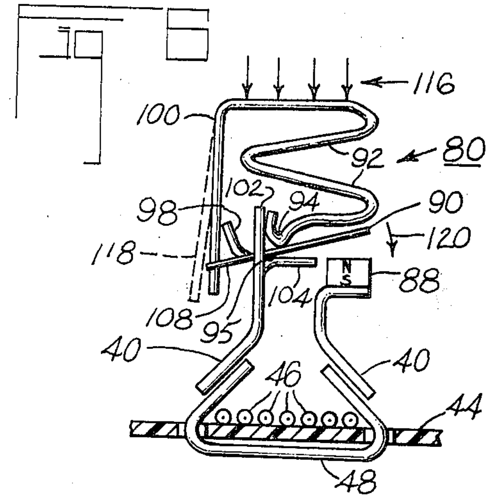

FIGS. 5 and 6 are assembly views showing a switching unit 80 assembled with a yoke 48, a portion of the circuit board 44, and conductors 46 extending through the yoke 48. A magnetic path indicated by the dashed line 114 is formed by this arrangement. The key top 24, key stem 68 and pusher 70, the housing 54 and catch 42, and the base 64 all have been omitted from FIGS. 5 and 6 for the purposes of clarity in showing the operation of the device.

Included in the switching unit 80 is a permanent magnet 88. The magnet 88 can be made of rubberized permanent magnet material, or Alnico or other conventional permanent magnet material. However, the rubberized magnetic material is preferred because it is relatively inexpensive, and because the armature 90 has less of a tendency to bounce when it hits the rubberized magnet.

Figure 7:
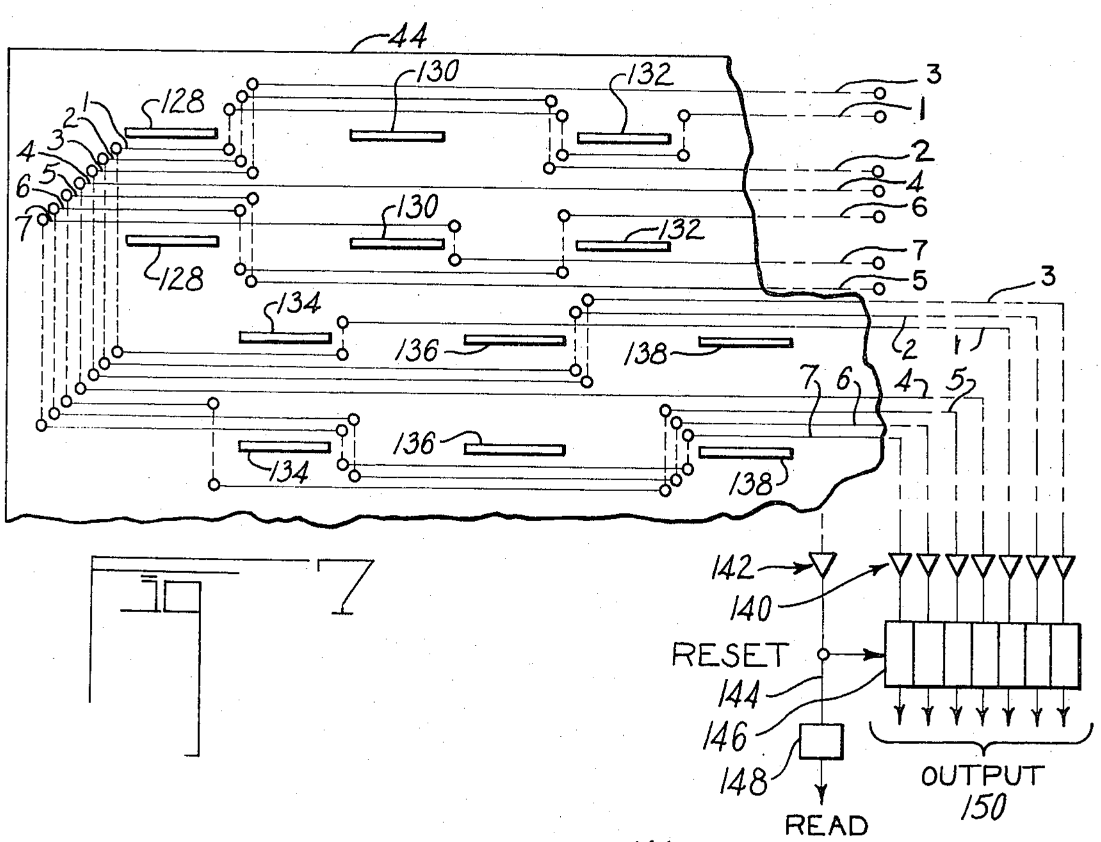
FIG. 7 is a plan view, partially schematic, of a portion of the keyboard shown in FIG. 1.
Figures 8, 9:
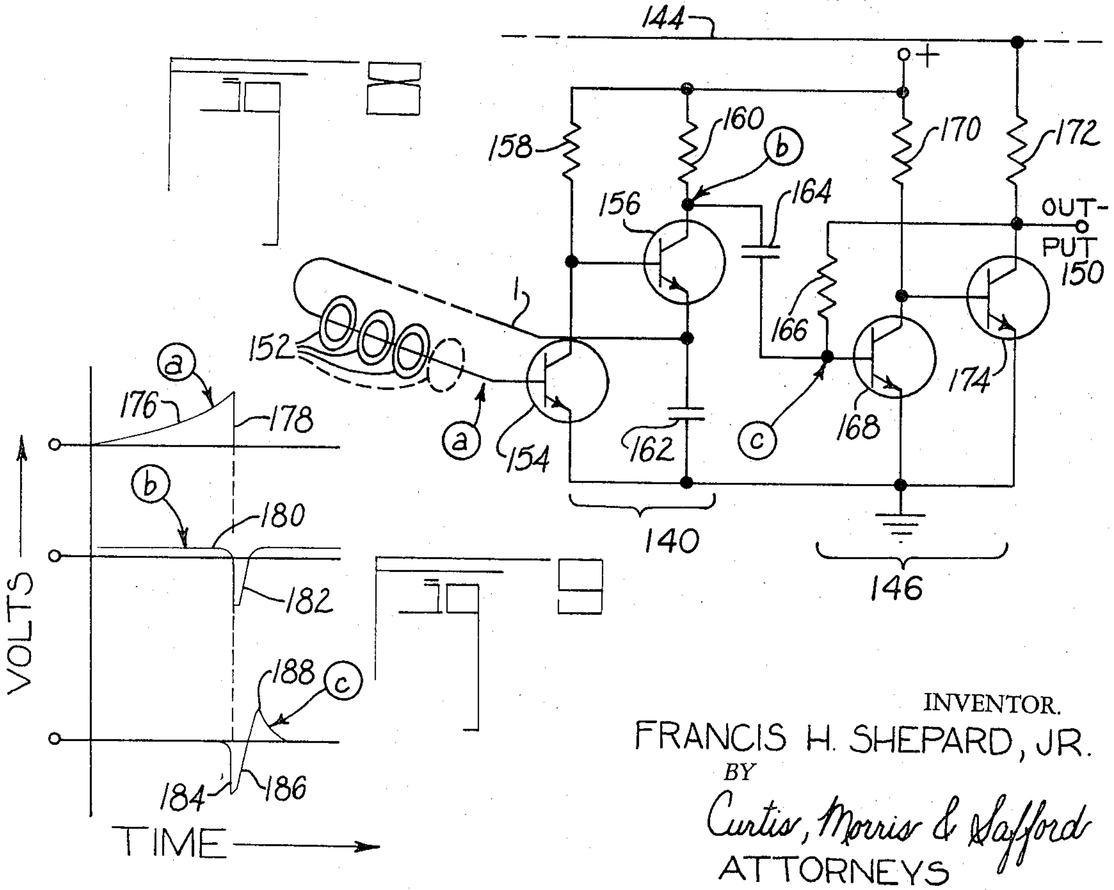
FIG. 8 is a detailed schematic circuit diagram of a portion of the circuit shown in FIG. 7.
FIG. 9 shows waveform diagrams of certain electrical signals in the circuit shown in FIG. 8.

An armature plate 90 is pivotably mounted so that one end moves up and down, away from and towards the upper surface of the magnet 88. The spring 82 is pushed upon by the pusher 70 in the direction indicated by arrows 116 (FIG. 6) when the key is depressed, and causes the right end of the armature 90 to tip upwardly from the position shown in FIG. 5 to the position shown in FIG. 6, and then urges it back downwardly very rapidly in the direction indicated by arrow 120 in FIG. 6. This has the effect of first forming a substantial air gap in the magnetic path 114, and then rapidly closing the air gap. The rapid closing of the air gap very quickly changes the reluctance of the magnetic path from a relatively high value to a relatively low value, thus creating a change in the flux intercepting the conductors 46, and inducing a voltage in each conductor passing through the yoke 48. If desired, this voltage pulse can be detected. However, it is preferred that the subsequent voltage change developed when the end of armature 90 hits the magnet 88 be detected instead because the flux change then is much faster and produces a sharper, more reliably detectable pulse. Circuitry is provided as shown in FIGS. 7 and 8 for detecting the above-described pulses, and amplifying them and delivering them to a computer or other utilization device.

The spring 82 preferably is made of a relatively thin non-magnetic material such as beryllium copper. The spring 82 has a serpentine portion including a pair of loops 92. The spring also has a relatively sharp bend at 94 along which the spring bears against the upper surface of the armature 90. The line along which contact is made between the spring and the armature is near the pivot axis 95 of the armature on its support. The other end of the spring 82 forms a vertical pusher section 100 which has a tab 96 extending downwardly from the left-hand corner of the portion 100, as is shown in FIG. 3.

Figure 4:
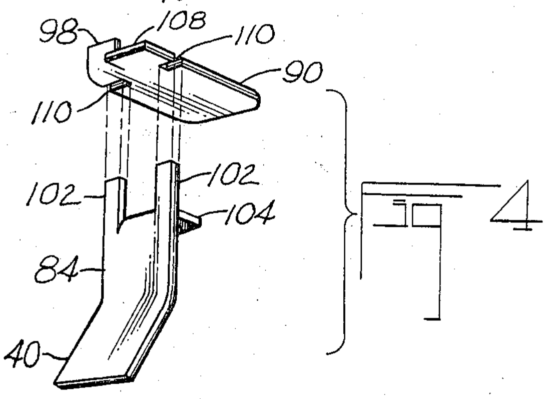
FIG. 4 is an exploded perspective view of certain components shown in FIG. 3.

As it is shown in FIGS. 3 and 4, the armature 90 has a tab 98 which is bent upwardly, and has a horizontally-extending projection 108 at its left end. The armature also has a pair of notches 110 which fit loosely over a pair of support posts 102 on a support member 84. The armature rests and pivots upon a horizontal projection 104 of the support 84. The pivot axis 95 is located at the bent corner of the projection 104. The lower portion 40 of the support 84 meets with one of the upstanding arms of the yoke 48.

The magnet 88 is secured to a horizontal surface 106 of another support 86. The lower portion 40 of support 86 meets with the other upstanding arm of the yoke 48 to complete the magnetic circuit as indicated by the dashed line 114.

As is best shown in FIGS. 5 and 6, one lower edge of the vertical portion 100 of spring 82 bears against the left-hand projection 108 of the armature 90. Also, the upstanding projection 98 of the armature is close to the pusher portion 100 of the spring. When the spring is compressed by downward pressure due to depression of the key, the pusher portion 100 pushes downwardly upon the end 108 of armature 90, pivots it on the bent edge of support 104, and lifts up the right end of the armature to pull it away from the magnet 88. However, as this tipping process continues, the lower edge of the pusher portion 100 tends to slip towards the left end of the end 108 of the armature. This tendency is made certain by the projection 98 which, as the armature 90 tips, pushes the portion 100 to the left and off the edge. The portion 100 is shown in FIG. 6 near the end of the portion 108 of armature 90, about ready to slip off. The dashed lines 118 indicate the position of the portion 100 just after it has slipped off. This motion releases the armature 90 so that it can return downwardly to the magnet 88.

While the armature 90 has been tipping upwardly, the end of the spring to the left of the bend 94 has been forced against the posts 102. Simultaneously, the spring has been flexed into the shape shown in FIG. 6. As it was pointed out above, the line 94 along which the spring 82 bears against the armature 90 is to the right of the pivot axis 95 of the armature. Thus, the spring exerts a force on the armature which tends to rapidly swing the armature back toward the magnet 88. This motion is very fast. Moreover, this motion is accelerated by the magnetic attraction between the armature 90 and the magnet 88, so that the change of flux in the magnetic path is made relatively large and the voltages induced in the conductors 46 are made commensurately large. Then, as the armature end hits the magnet 88, the flux stops changing very suddenly, and the very sudden cessation of flux change induces a sharp negative voltage excursion in the conductors.

When the key is released, the spring 82 moves upwardly, pushing against the pusher 70, and returning the key top 24 to its initial undepressed position.

An advantageous feature of the foregoing structure is that when the end of the pusher section 100 of the spring slips off of the end 108 of the armature, this creates a clearly audible "click" noise and vibrations which can be felt in the fingers of the operator, both of which indicate to the operator that the key has been operated properly.

THE CODE CARD

FIG. 7 shows a segment of a preferred form of code card 44, with the yokes 48 removed for the sake of clarity. In the place of each yoke is shown a pair of slots 128, 130, 132, 134, 136 and 138, through each of which one upwardly-extending arm of a yoke 48 will extend. Therefore the conductors extending from left to right between each pair of slots are the conductors in which voltages are generated if the key above those slots is actuated.

The board 44 preferably is a conventional printed circuit board with conductors on the front side shown in solid lines, conductors on the back side shown as dashed lines, and plated-through holes shown as circles joining the back and front conductors.

In the specific example shown in FIG. 7, there are seven conductors, given reference numerals 1 through 7, respectively. The number of conductors used depends upon the type of code used, the number of characters to be encoded, and similar considerations. The seven conductors shown are used in encoding characters for a keyboard in accordance with the standard "ASCII" code. However, other codes can be used if desired.

In the code used, all of the conductors extend through the magnetic path associated with the slots 128. However, only conductors 4 and 7 extend between slots 130, and conductors 1, 2, 4 and 6 extend between slots 132. The arrangement of conductors between each pair of slots thus varies in accordance with the code used.

When it is desired that a conductor not pass between a particular pair of slots, the conductor simply is connected through the printed circuit board to a vertical conductor on the other side, and then re-emerges on the front side to a position outside of the horizontal row of slots. The conductor then continues horizontally outside of the area encompassed by the slots. Thus, the conductors 1, 2 and 3 extend above the area encompassed by slots 130, and the conductors 5 and 6 extend below the area encompassed by those slots so as to avoid receiving voltage pulses due to depression of the key associated with those slots.

As it is shown at the left side of FIG. 7, the conductors 1 through 7 are extended to the next horizontal row of slots by vertical conductors on the opposite side of the circuit board.

Eventually, both ends of each conductor 1 through 7 are connected to one of seven amplifiers 140, each of whose output is delivered to a flip-flop 146. The outputs of the flip-flops 146, together with a "read" signal, to be described below, then comprise the output of the keyboard.

Not shown in FIG. 7 is another conductor which extends between each of the pairs of slots and is connected to an amplifier 142. The output of amplifier 142 is delivered as a reset signal to the flip-flops 146, and is delivered to a time-delay multivibrator 148 which then delivers "read" signal to the computer and causes it to read the outputs of the flip-flops 146.

FIG. 8 shows a circuit which has been used successfully to form one of the amplifiers 140 and one of the flip-flops 146. The other amplifiers 140 and 142, and flip-flop 146 are identical. In the circuit shown in FIG. 8, the conductor number 1 is shown as the input conductor, by way of example. The magnetic paths extending around conductor number 1 are represented schematically by toroidal cores 152.

The ends of the conductor 1 are connected to two transistors 154 and 156 which perform an amplifying function. Transistor 154 is normally biased, by means of the resistor 158, in the "on" condition, whereas transistor 156 normally is substantially in the "off" condition.

FIG. 9 shows the approximate wave forms of various voltages in the circuit of FIG. 8. Curve *a* shows the voltage pulse which is developed in a single conductor by the operation of the switching unit 80. The time shown in FIG. 9 starts at the instant the end of the armature 90 starts to return towards the magnet 88. As the armature accelerates, the voltage developed in the conductor, indicated by portion 176 of the curve, increases gradually, at a gradually increasing rate. Then, at the time indicated by numeral 178, the armature end hits the magnet 88, and the induced voltage drops sharply, thus forming a sharp pulse which is detected and used to drive the flip-flop to the proper logic state.

It is noteworthy that the magnitude of the voltage pulse developed in each of the conductors 1 through 7 is substantially greater than in previous encoding devices of a similar type. For example, voltage pulses of the order of 10 millivolts have been obtained in circuits actually tested, as compared with voltages of around 1 or 2 millivolts in previous devices. One reason for this increase in voltage output is believed to result from the provision of a separate magnet and flux path for each and every key so that flux is not lost through adjacent flux paths, and so that substantially all of the flux is used to generate voltages in the conductors associated with a particular key.

Returning to FIG. 8, the combination of the capacitor 162 and resistor 160 in series with transistor 156 constitutes a differentiating circuit which produces the voltage wave form *b* shown in FIG. 9. The portion 180 of curve *b* is relatively level, whereas a sharp negative spike 182 is produced in response to the voltage drop 178 at the input. The voltage at point *b* goes through a differentiating capacitor 164 which produces a signal whose wave-form *c* is shown in FIG. 9. Wave form *c* has a negative spike 184, as well as a positive-going portion which culminates in a positive pulse 188. The latter signal is applied to the flip-flop 146 which consists of two transistors 168 and 174, and a pair of resistors 170 and 172 connected as shown in the drawing. The upper end of resistor 172 is connected to the reset line 144 to receive a reset pulse, and the upper end of the resistor 170 is connected to the positive power supply. The output terminal 150 is connected to the collector lead of transistor 174.

The reset pulse has the shape of the pulse 182. The reset line 144 normally is maintained at the supply voltage. The reset pulse removes the supply voltage to transistor 174 momentarily, thus turning off transistor 168. This causes base current to be drawn from transistor 174, which thus is left on when the reset pulse ends. This grounds the output terminal 150 and provides a logical zero output signal. If the conductor 1 does have a signal on it, the positive pulse 188 "sets" the flip-flop to a 1 state. This is accomplished by turning on transistor 168, thus turning transistor 174 off, and causing the voltage on terminal 150 to rise to the supply voltage. Then, the time-delayed read signal is delivered to the computer, which samples the outputs of the flip-flops 146 to read the coded signal.

In an alternative embodiment of the invention, the extra conductor used for developing a reset pulse is eliminated. Instead, an odd-parity code is used which includes a parity bit. This assures that there always will be a "one" in the output signal. The outputs of the amplifiers 140 are sent to an OR gate (not shown) whose output is used as a reset signal, and, through a time-delay circuit, is used as a read pulse. Thus, a reset signal had a read signal will be provided without an additional conductor.

Detecting the voltage signal 178 has the advantage that when it is differentiated a very sharp, brief pulse 182 is developed, as is shown in FIG. 9. This makes it extremely unlikely that an erroneous code will be produced when two keys accidentally are hit simultaneously by the operator.

The armature 90, the supports 84 and 86, and the yoke 48, comprising all of components in the magnetic path 114, preferably are made of a magnetically permeable material such as soft iron or a mild steel.

Some of the advantages of the encoding device and keyboard described above are the relative simplicity and low cost of the components. Further, the modular construction permits easy maintenance and change of keys or codes. Additionally, the use of an individual magnet and separate magnetic path for each key concentrates the flux and minimizes cross-coupling and flux losses. This provides increased voltages in the conductors and better reliability of operation. Also, the polarity of the voltages induced in the wires can be reversed simply by lifting out one of the key modules, rotating it by 180°, and replacing it in the keyboard.

Figure 10:
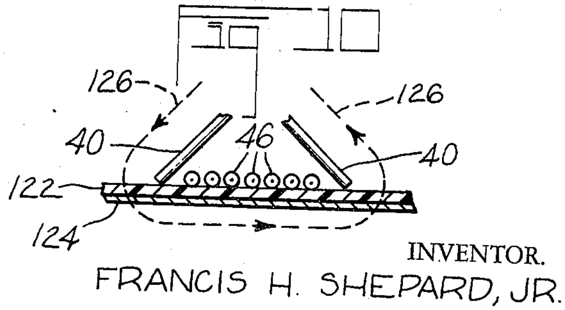
FIG. 10 is a cross-sectional, partially schematic view of another embodiment of the invention.

Another embodiment of the invention which is even simpler than that described above is shown, in part, in FIG. 10. The construction shown in FIG. 10 is identical to that shown in the other figures of the drawings, except that the yokes 48 are omitted. Instead, a continuous coating or sheet 124 of soft iron is placed on the back of the printed circuit panel 122. The magnetic path 126 thus formed flows through the coating 124, as well as through the legs 40. Thus, the need for separate yokes 48 and their assembly in the board 44 is avoided. Of course, the conductors on the undersurface of the board 44 should be electrically insulated from the iron, such as by means of a sprayed-on coating of insulation.

The above description of the invention is intended to be illustrative and not limiting. Various changes or modifications in the embodiments described may occur to those skilled in the art and these can be made without departing from the spirit or scope of the invention.

I claim:

1. An encoding device comprising, in combination, a key member, means for rapidly changing the reluctance of a magnetic path between a relatively low value and a relatively high value in response to actuation of said key member, a permanent magnet in said magnetic path, one or more conductors in close proximity to and substantially surrounded by said magnetic path, said one or more conductors being arranged in a coded array, means for detecting the electrical voltage induced in said one or more conductors by the change in flux created by the change in reluctance in said path, said reluctance changing means including a magnetic member which is movable to provide a variable air gap in said magnetic path, and resilient means for accelerating the movement of said magnetic member, means responsive to movement of said key member in one direction to move said magnetic member away from an initial position to increase said air gap while biasing said resilient means, and for releasing said magnetic member to snap back towards said initial position.

2. A keyboard encoder comprising a keyboard with a plurality of key assemblies, each of said assemblies comprising a device as in claim 1.

3. An encoder as in claim 2 in which each of said conductors passes through a plurality of said magnetic paths, the ones of said paths through which each conductor passes being determined in accordance with a code.

4. In or for an encoding device, the combination of a support, a key member on said support, at least one movable magnetic member on said support, resilient means on said support for moving said magnetic member with snap action between a low reluctance position with respect to a magnetic path, a high reluctance position with respect to said path in response to actuation of said key member, a permanent magnet in said path for supplying mangetic flux thereto, a key lever, means coupling said key lever to said resilient means for returning said key lever to its initial position, said resilient means being adapted to first engage and then slip over an edge of said magnetic member upon depression of said key lever, thereby creating an audible noise indicating satisfactory operation.

5. A snap-acting encoding key module, said module comprising, in combination, a housing, a spring in said housing, a key lever for depressing said spring from without said housing, a magnetically permeable armature in said housing, and means for snapping said armature rapidly from one position to the other in said housing in response to depression of said spring, said one position being away from a member in a magnetic circuit, and said other position being adjacent said member.

6. A key module as in claim 5 including at least one external magnetic member extending outside said housing and forming, with said armature, part of said magnetic path.

7. A key module as in claim 5 in which said member is a permanent magnet in said housing at said other position, said armature being adapted to move towards and away from said magnet.

8. A key module as in claim 5 in which said key module is pivotably mounted and including a pusher member actuatable by said key lever for pushing said armature, tipping it about its pivot, and sliding over one end of said armature to permit said armature to return to rest under the urging of said spring.

9. A key module as in claim 5 including a permanent magnet in said housing, a magnetically permeable support for pivotably supporting said armature for movement of one end towards and away from said magnet, said spring having a pusher portion positioned to push upon the other end of said armature in response to depression of said spring, and another portion for urging said one end of said armature towards said magnet, the spring force applied by said other portion of said spring being applied at a position closer to the pivot axis of said armature than the position of application of force by said pusher portion, said armature having a projection for sliding said pusher portion of said spring off of said other end of said armature upon tipping of said armature about said pivot, another magnetically permeable support for supporting said magnet in said housing, both of said supports having end portions extending outside of said housing and positioned so as to form, together with an external magnetic shunt, a loop of magnetic material with said magnet in series and including said armature.

10. A module as in claim 8 including a projection on said armature for sliding said pusher member off said one end when said armature is tipped to a given angle.

11. In an encoder including a magnet, a magnetic circuit including said magnet, one or more conductors in a coded array and positioned with respect to said circuit so as to be traversed by magnetic flux lines therefrom, and means for opening and rapidly closing said circuit to create flux changes and thereby induce voltages in said conductors, means for detecting the voltages induced in said one or more conductors by the rapid closing of said circuit.

12. An encoder as in claim 11 in which said detecting means includes means for detecting only the voltage change caused by completion of said circuit closing.

13. An encoder as in claim 11 in which said opening and closing means includes an armature movable rapidly from a position opening said circuit to an abrupt stop at a position substantially closing said circuit, said detecting means including means for detecting only the voltage change in said conductors caused by said abrupt stop.

14. An encoder as in claim 13 in which said detecting means includes a differentiating circuit.

15. An encoder as in claim 11 including a housing, a plurality of keys extending out of said housing, each of said keys being connected to actuate one of said opening and closing means, there being one magnet, magnetic circuit opening and closing means for each key, each such circuit forming a loop through which one or more of said conductors extends.

16. An encoder as in claim 15, said conductors being printed on a printed circuit board, each of the conductors extending through a plurality of said loops, in accordance with a code.

17. An encoder as in claim 16 in which said loops are arranged in rows, said conductors extending through said rows of loops on one side of said board with transverse conductors on the other side of said board, said transverse conductors extending said conductors back and forth beyond said rows wherever needed to prevent a selected conductor from passing through a selected loop.

18. An encoding device comprising a plurality of key members connected to a like plurality of key modules each of which includes means for rapidly changing the reluctance of a magnetic path between a relatively low value and a relatively high value in response to actuation of said key member, a plurality of conductors arranged in a plurality of coded arrays on a circuit board, there being one such array for each key module, first magnetically permeable means extending from each of said key modules and forming part of a magnetic path, further magnetically permeable means on said circuit board for completing said magnetic path for each of said modules when said first permeable means on each of said modules is positioned on said circuit board adjacent the further permeable means thereon, with each of said paths extending around the conductors of one of said arrays, and a permanent magnet in each of said paths.

19. An encoding device as in claim 18 in which the further permeable means on said circuit board comprises a plurality of yokes with projections extending through said board.

20. An encoding device as in claim 18 in which the further permeable means on said circuit board comprises a continuous coating of magnetically permeable material on a first side of said board which is spaced the farthest from said modules, and in which the first permeable means on each module comprises a pair of arms extending to positions adjacent the second side of said board which is spaced nearest to said modules.

* * * * *